Oct. 1, 1940.  W. L. KAUFFMAN, 2D  2,216,394
WRINGER
Filed March 15, 1938
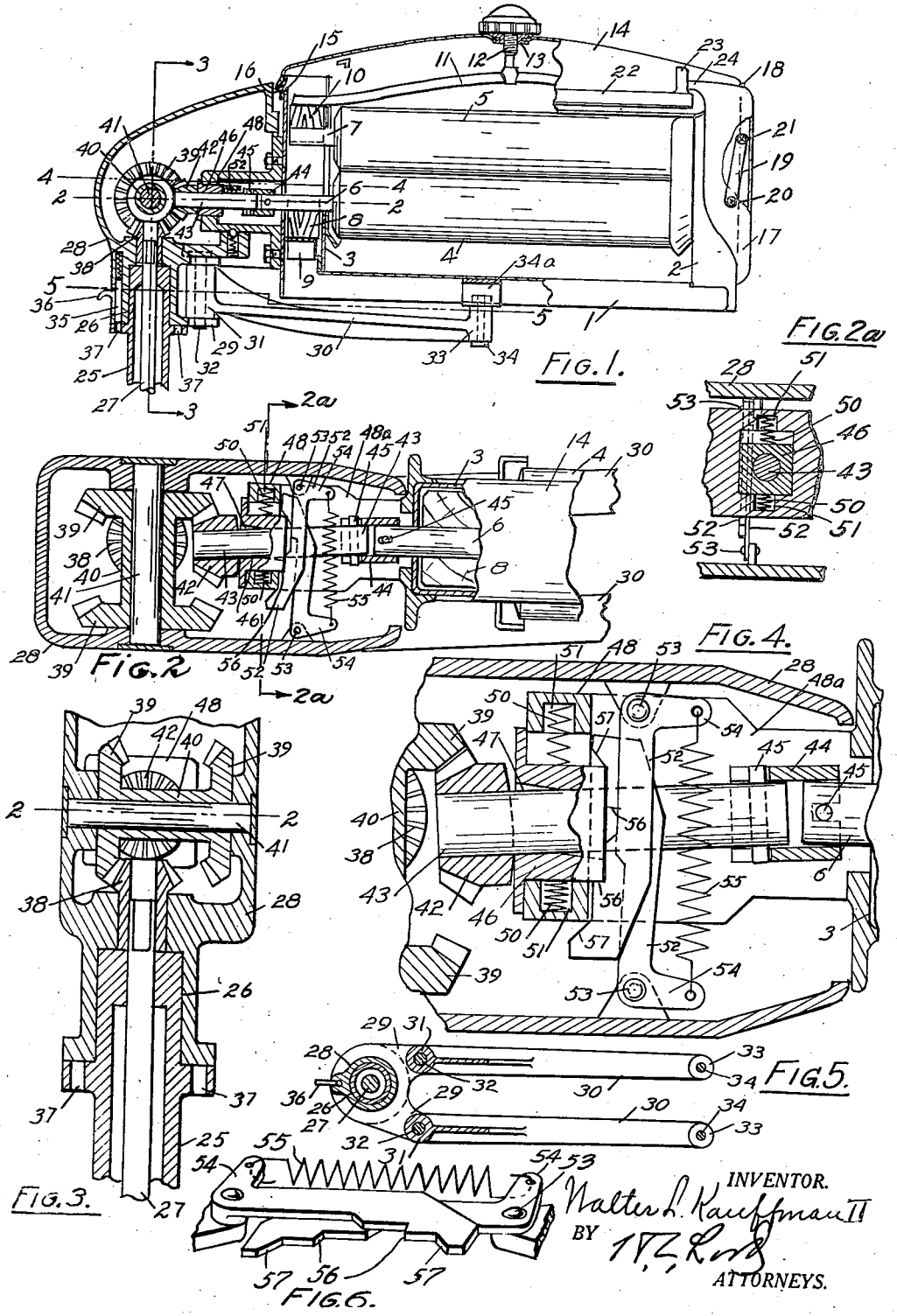
INVENTOR.
Walter L. Kauffman II
BY
ATTORNEYS.

Patented Oct. 1, 1940

2,216,394

UNITED STATES PATENT OFFICE 2,216,394

WRINGER

Walter L. Kauffman, II, Erie, Pa., assignor to Lovell Manufacturing Company, Erie, Pa., a corporation of Pennsylvania Application March 15, 1938, Serial No. 196,023

14 Claims. (Cl. 68—269)

Power wringers as commonly made are provided with some safety device to prevent the continued indrawing of the hand or clothes of the operator should they become caught in the rolls. There have been two general schemes of safety devices, one involving the release of pressure on the rolls and the other a means for stopping the continued movement of the rolls. Some wringers have been provided with both devices. Various means have been made to accomplish the stopping of the rolls or the release of pressure. The present invention contemplates a movement of the wringer itself to actuate the safety device. Such wringers have been devised but they have certain faults largely arising from the fact that the movement of the wringer to accomplish a safety action is not uniform, in consequence of which there is a difference in the response to the action of the operator when caught near one end of the wringer rolls as distinguished from the opposite end, or the movement may interfere with the convenient operating of the wringer in ordinary use.

In the present invention provision is made whereby the movement throughout the length of the roll is substantially uniform involving the same resistance to movement throughout and at the same time the wringer is maintained in proper operating position at all times. The broad purposes of the invention are accomplished by mounting the wringer frame on a paralleling device which permits a movement of all parts of the wringer equally in accomplishing the operation of the safety mechanism. Features and details of the invention will appear from the specification and claims.

A preferred embodiment of the invention is illustrated in the accompanying drawing as follows:

Fig. 1 shows a front elevation of a wringer including the invention, parts being in section to better show construction.

Fig. 2 a section on the line 2—2 in Figs. 1 and 3.

Fig. 2a a section on the line 2a—2a in Fig. 2.

Fig. 3 a section on the line 3—3 in Fig. 1.

Fig. 4 an enlarged section on the line 4—4 in Fig. 1.

Fig. 5 a section on the line 5—5 in Fig. 1.

Fig. 6 a detached view of gear holding latches.

I marks the base of the wringer, 2 the stile away from the driving end, 3 the stile at the driving end of the wringer, 4 and 5 the bottom and upper rolls respectively, 6 and 7 the shafts for the rolls 4 and 5. Bearings 8 are provided for the shaft 6, these bearings resting on brackets 9 arranged in the stiles. Bearings 10 are provided for the shaft 7 and are slidingly mounted in the stiles. A spring 11 rests on the bearings 10 and is put under tension by screw 12 operating in a nut 13. A top bar 14 is arranged over the stiles and the nut 13 is fixed in the top bar. The top bar at the driving end of the wringer has shoulders 16 adapted to engage shoulders 15 struck up out of the stile 3 and the interlocking of these shoulders detachably locks this end of the top bar on the stile. The opposite end of the top bar is provided with a resetting and release mechanism. This involves a lever 17 hinged on the top bar at 18. The lever 17 is connected by a link 19 through a pivot 20 with the lever 17 and through a pivot 21 with the stile 2. The lever and link form a toggle which is adapted to reset the top bar from release position by forcing the lever downwardly to set position. The pivots 20, 21 and 18 are slightly out of line in set position and therefore under pressure tend to hold the mechanism in set position. The top bar 22 extends across the front of the wringer and this is mounted on arms 23, the arms being pivotally mounted in the top bar and one of the arms being adapted to engage a lever extension 24 on the lever 17. With a downward movement of the top bar the end 24 is depressed forcing the lever 17 outwardly sufficiently to reverse the relation of the pivots 20, 21 and 18, thus releasing the end of the top bar opposite the driving mechanism, and with the up-swinging of this end of the top bar the shoulders 15 and 16 are released, thus releasing the pressure on the rolls. The mechanism so far as described is specifically not involved in the present invention as they form subject matter of patents or applications pending.

The wringer is supported on a post 25 which is hollow and provided with a bearing 26 at its upper end through which the drive shaft 27 for the wringer extends. A head 28 which carries the gear mechanism and the wringer is pivotally mounted on the top of the post to permit the wringer to be swung to different positions in use. The head 28 is provided with ears 29 and paralleling links 30 are provided with bearing ends 31 which are arranged between the ears 29. Pivot pins 32 extend through the ears and the bearing ends 31 and provided pivotal mountings for the arms 30. As shown these pivots are arranged with vertical axes. The outer end of the arms or links 30 are provided with bearing ends 33 and pivot pins 34 extend through these ends and are secured to a cross plate 34a on the base of the wringer.

These parallel arms permit a bodily movement of the wringer forward and back and transversely of the rolls, the movement being uniform from end to end of the wringer, and offering the same resistance or lack of resistance to the movement throughout the length of the roll. While I have shown the axes of these paralleling links as arranged in a vertical direction, broadly speaking the paralleling links may be arranged with any relation of axes other than vertical that will provide the uniform swinging movement of the wringer.

A bolt 35 is slidingly mounted in the head and is provided with a handle 36 by means of which it may be operated. The bolt is adapted to enter openings 37 in the post so as to lock the head in different positions of adjustment.

A bevel gear 38 is locked on the upper end of the shaft 27. Bevel gears 39 are arranged on a common hub 40. The hub is journaled on a shaft 41 extending front to rear of the gear case forming a portion of the head. The bevel gears 39 are arranged at opposite sides of the bevel gear 38 and so placed that the bevel gear 38 is in mesh with one of the gears 39. A bevel gear 42 is mounted on a shaft 43. The shaft 43 is connected through a universal joint with the shaft 6, the joint being moved by sleeve 44 connected by cross pins 45 with the shafts 6 and 43.

A bearing 46 has a flaring opening 47 which permits the shaft 43 to swing in the bearing slightly. The bearing 46 is slidingly mounted in a cross head 48 which is carried by a bracket 48a secured by screws 49 on the stile 3. Springs 50 are arranged in sockets 51 in the cross-head 48 and yieldingly bear against the bearing 46. The springs are of equal capacity and tend to hold the bearing in a central position.

Latches 52 are pivotally mounted in the head or case by pivots 53. These latches are oppositely placed and extend across the case overlapping each other. The latches have bell crank arms 54 which are connected by spring 55 so that the latches are yieldingly forced against the sliding bearing 46. These latches are provided with locking shoulders 56 adapted to swing in on the opposite faces of the sliding bearing, one latch locking the sliding bearing in one end of its movement and the other locking the sliding bearing in the opposite end of its movement so as to hold the bevel gear 42 against disengagement when set through the thrust of the bevel gears. Cam surfaces 57 are provided which are adapted to engage the ends of the cross-head so that with an initial movement of the cross-head with the wringer, the cross-head operating on the cam 57 swings the cam of the latch, locking the sliding bearing, and is forced sidewise sufficiently to unlock the latch.

The preliminary movement of the wringer therefore carrying with it the cross-head first operates on the cam within the limit of movement, thus forcing out the latch. The continued movement of the wringer and the balancing action of the springs forces the gear 42 out of mesh. If the movement of the wringer is continued the gear 42 is carried into mesh with the opposite bevel gear 45 so as to reverse the wringer. It will be noted that with the wringer in operative position the wringer is moved forward on the links throwing the bevel gear 42 in mesh with the rear gear 39 as shown in Fig. 2.

Should the operator get caught, the instinctive action of the operator is to pull back against the indrawing of the rolls and this effects a forward movement of the wringer carrying with it the cross-head. With the initial movement the cam at the front side releases the latch and unlocks that latch from the bearing 46. The continued movement of the wringer to the central position effects the releasing of the bevel gear 42 and through the balancing action of the spring places the bevel gear in a neutral position out of mesh with either gear 39. The continued pulling forward of the wringer moves the gear 42 into mesh with the front bevel gear 39 thus reversing the wringer. As shown, therefore, this safety feature of this wringer in response to the movement of the wringer frame is a stopping of the rolls and preferably not only stopping but reversing of the rolls. With the free hand the pressure may also be released by striking the trip bar 22. A pull on the trip bar will not only release the pressure but also effect, if the thrust is continued, a movement of the wringer frame and this will stop or reverse the movement of the wringer rolls.

What I claim as new is:

1. In a wringer having a wringer frame, rolls mounted in the frame, a driving mechanism for the wringer, and a safety device for the wringer; the combination with said frame, driving mechanism and safety device of supporting means for the frame comprising a movable mounting for the frame arranged and adapted to allow the said frame in response to a thrust by an operator to be moved transversely with respect to said support to another position relative to said support that is parallel to the first named position, and communicating means actuating the safety device in response to a wringer frame movement.

2. In a wringer having a wringer frame, rolls mounted in the frame, a driving mechanism for the wringer, and a safety device for the wringer; the combination with said frame, driving mechanism and safety device of supporting means for the frame comprising a movable mounting for the frame arranged and adapted to allow the said frame in response to a forward or backward thrust by an operative to be moved transversely with respect to said support to another position relative to said support that is parallel to the first named position, and communicating means actuating the safety device in response to a wringer frame movement.

3. In a wringer having a wringer frame, rolls mounted in the frame, a driving mechanism for the wringer and a safety device; the combination with said frame, rolls, driving mechanism and safety device of a supporting means for the frame comprising a movable mounting for the frame having parallel swinging links arranged and adapted to allow said frame to be moved bodily, said links compelling a movement from one position relative to said supporting means to another position relative to said supporting means that is parallel to the first named position, and a communicating means actuating the safety device in response to a wringer frame movement.

4. In a wringer having a wringer frame, rolls mounted in the frame, a driving mechanism for the wringer and a safety device; the combination with said frame, rolls, driving mechanism and safety device of a supporting means for the frame comprising a movable mounting for the frame having parallel swinging links, the pivots of said links having vertical axes, arranged and adapted to allow said frame to be moved bodily, said links compelling a movement from one position relative to said supporting means to another position relative to said supporting means that is parallel to the first named position, and a communicating means actuating the safety device in response to a wringer frame.

5. In a wringer having a wringer frame, rolls mounted in the frame, a driving mechanism for the wringer and a safety device for the wringer comprising mechanism effecting the release of the driving mechanism; the combination with said frame, rolls, release mechanism and safety device of supporting means for the frame comprising a movable mounting for the frame arranged and adapted to allow the said frame in response to a thrust by an operator to be moved transversely with respect to the supporting means, said mounting compelling a movement from one position relatively to said support to another position relative to said support that is parallel to the first named position, and communicating means actuating the safety device in response to a wringer frame movement.

6. In a wringer having a wringer frame, rolls mounted in the frame, a driving mechanism for the wringer and a safety device for the wringer comprising mechanism effecting the release of the driving mechanism; the combination with said frame, release mechanism and safety device of supporting means for the frame comprising a movable mounting for the frame arranged and adapted to allow the said frame in response to a forward or downward thrust by an operator to be moved transversely with respect to the supporting means, said mounting compelling a movement from one position relatively to said support to another position relative to said support that is parallel to the first named position, and communicating means actuating the safety device in response to a wringer frame movement.

7. In a wringer having a wringer frame, rolls mounted in the frame, a driving mechanism for the wringer and a safety device for the wringer, comprising mechanism establishing a roll drive in one direction in one position of the frame, and a roll drive in the opposite direction in a different position of the frame; the combination with said frame, rolls, release mechanism and safety device of supporting means for the frame comprising a movable mounting for the frame arranged and adapted to allow the said frame in response to a thrust by an operator to be moved transversely with respect to the supporting means, said mounting compelling a movement from one position relatively to said support to another position relative to said support that is parallel to the first named position, and communicating means actuating the safety device in response to a wringer frame movement.

8. In a wringer having a wringer frame, rolls mounted in the frame, a driving mechanism for the wringer and a safety device for the wringer comprising mechanism effecting the release of the driving mechanism in response to a movement of the wringer frame, means for locking the driving mechanism against disengagement through thrust of the driving mechanism; the combination with said frame, rolls, driving mechanism, safety device and locking means of supporting means for the frame comprising a movable mounting for the frame arranged and adapted to allow the said frame in response to a thrust by an operator to be moved transversely with respect to the supporting means, said mounting compelling a movement from one position relatively to said support to another position relative to said support that is parallel to the first named position, and communicating means actuating the safety device in response to a wringer frame movement.

9. In a wringer having a wringer frame, rolls mounted in the frame, a driving mechanism for the wringer and a safety device for the wringer comprising mechanism effecting the release of the driving mechanism in response to a movement of the wringer frame, means for locking the driving mechanism against disengagement through thrust of the driving mechanism and devices operatively associated with the wringer frame actuated with the initial movement of the wringer frame releasing the locking means; the combination with said frame, rolls, driving mechanism and safety device of supporting means for the frame comprising a movable mounting for the frame arranged and adapted to allow the said frame in response to a thrust by an operator to be moved transversely with respect to the supporting means, said mounting compelling a movement from one position relative to said support to another position relative to said support that is parallel to the first named position, and communicating means actuating the safety device in response to a wringer frame movement.

10. In a wringer having a wringer frame, rolls mounted in the frame, driving mechanism for the wringer, a safety release device for the wringer and a supporting means comprising a movable mounting for the frame arranged and adapted to allow the frame in response to a thrust by an operator to be moved with relation to the supporting means transversely with respect to the axes of the rolls; the combination with said frame, rolls, driving mechanism, safety device and supporting means of means for locking the driving mechanism against disengagement through thrust of the driving mechanism, and communicating means actuating the safety release in response to a movement of the wringer frame.

11. In a wringer having a wringer frame, rolls mounted in the frame, driving mechanism for the wringer and a safety release device for the wringer and a supporting means comprising a movable mounting for the frame arranged and adapted to allow the frame in response to a thrust by an operator to be moved with relation to the supporting means transversely with respect to the axes of the rolls; the combination with said frame, rolls, driving mechanism, safety device and supporting means of means for locking the driving mechanism against disengagement through thrust of the driving mechanism, and communicating means actuated with an initial movement of the wringer releasing the locking means and with a continued movement of the wringer actuating the safety device.

12. In a wringer having a wringer frame, rolls mounted in the frame, driving mechanism for the wringer, a safety release device for the wringer and a supporting means comprising a movable mounting for the frame arranged and adapted to allow the frame in response to a thrust by an operator to be moved with relation to the supporting means transversely with respect to the axes of the rolls; the combination with said frame, rolls, driving mechanism, safety device and supporting means, safety device releasing the driving connection, of means for locking the driving mechanism against disengagement through thrust of the driving mechanism, and communicating means actuating the safety release in response to a movement of the wringer frame.

13. In a wringer having a wringer frame, rolls mounted on the frame, means comprising a movable mounting for the frame arranged and adapted to allow the frame in response to a thrust of an operator to be moved with relation to the supporting means transversely with respect to the axis of the rolls; the combination with said frame, rolls and supporting means of a driving mechanism for the wringer comprising a pair of opposing gears spaced apart, a roll shaft, a gear on the shaft adapted to engage either of said opposing gears, said opposing gears being spaced to provide a neutral position for the shaft gear, means for driving said opposing gears in the same direction, bearings for the roll shaft, a cross head for the bearing in which the bearing is slidingly mounted, latches locking the bearing to maintain the shaft gear in mesh, means associated with the wringer frame actuated by the initial movement of the wringer frame to release the latches, said means having a member which on continued movement disengages the shaft, and yielding means centering the bearing when released.

14. In a wringer having a wringer frame, rolls mounted in the frame, driving mechanism for the rolls, pressure means for the rolls, safety devices for the wringer comprising means for releasing the pressure means and the driving mechanism; the combination with the frame, rolls, driving mechanism, pressure means and safety devices of supporting means comprising a movable mounting for the frame arranged and adapted to allow the said frame in response to a thrust by an operator to be moved with relation to said supporting means transversely with respect to the axes of the rolls, said mounting compelling a movement from one position relatively to said supporting means to another position relative to said supporting means that is parallel to the first named position, and a device acting to release both safety devices under a continued thrust by the operator.

WALTER L. KAUFFMAN, II.